UNITED STATES PATENT OFFICE.

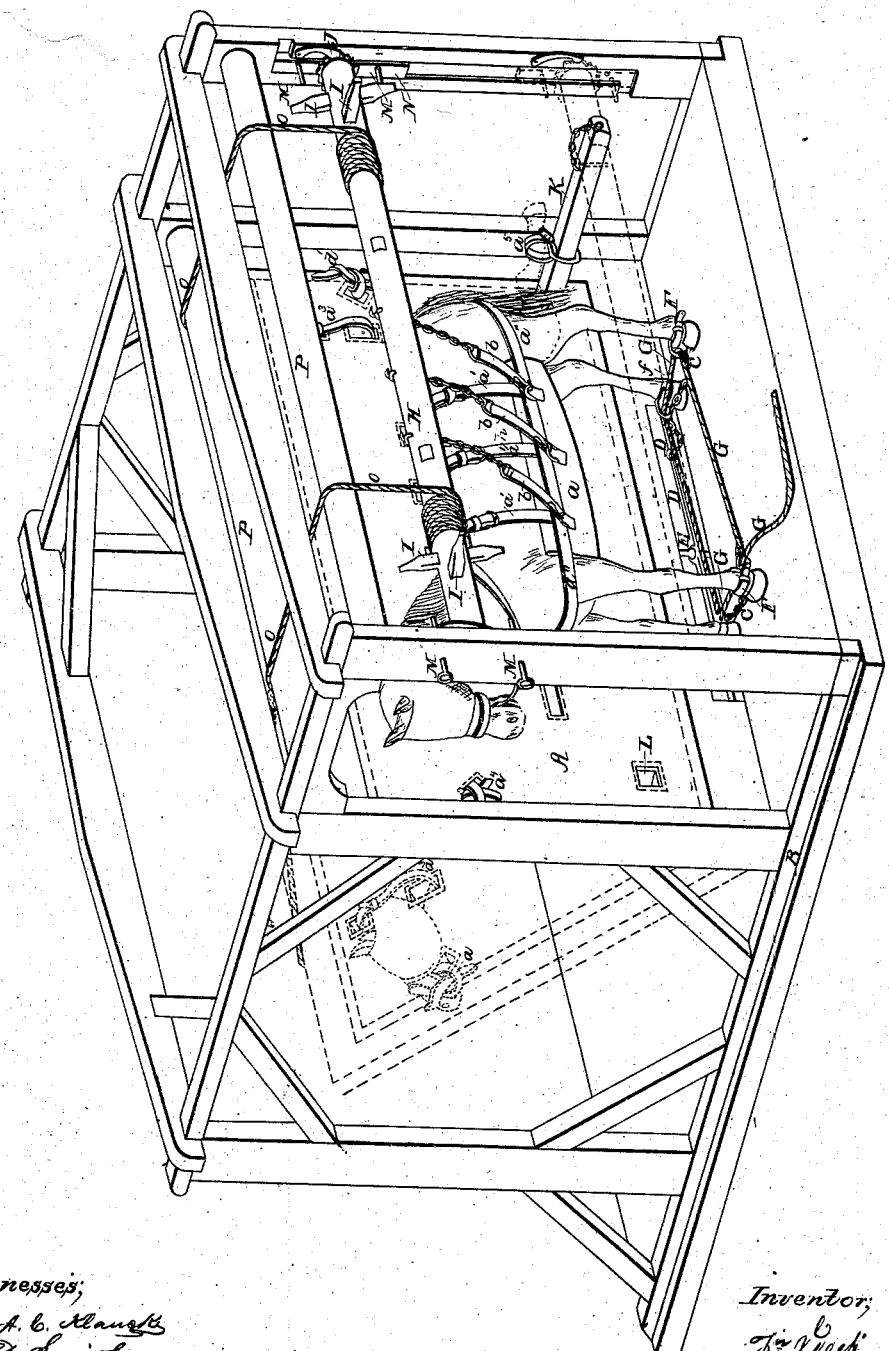

FELIX VOGELI, OF NEWBURG, NEW YORK.

IMPROVED HORSE-FASTENER.

Specification forming part of Letters Patent No. 48,225, dated June 13, 1865.

*To all whom it may concern:*

Be it known that I, FELIX VOGELI, of Newburg, in the county of Orange and State of New York, have invented a new and useful Improvement in Machines for Fastening Horses for Surgical, Shoeing, or other Purposes; and I do hereby declare the following to be a full, clear, and exact description of the nature, construction, and operation of the same, reference being had to the annexed drawings, making part of this specification, in which my improvement is represented by a perspective view.

To enable one skilled in the construction and use of such devices to fully understand and use my invention, I will proceed to describe it in detail.

The machine is used for the following purposes: to attach horses which have painful or difficult wounds to treat; also, to perform surgical operations, either in a standing position or such operations as can only be effected while the animal is lying down; to maintain the animal at option in a lying or standing position, so as to rest or ease the animal, which is unable, owing to the character of the wound, to assume a change of position by its own motions or choice; to suspend an animal clear of the ground, so as to sustain its weight in cases where it is necessary, as in fractures and laxations of the limbs; to shoe vicious and dangerous horses and mules and draft oxen, and perform various operations on the foot.

The machine is composed of the following parts:

A is a shutter to which the animal is fastened, and is hinged at its lower end in the sills of the frame B. It is capable, by means hereinafter to be described, of assuming a horizontal position, in which case it forms an operating-table. The shutter A is pierced with openings for the straps which attach to the shutter the head, the neck, and the body of the animal. They are so disposed as to enable the animal to be attached with its head in either direction, so as to expose either side of the animal to the operator. These straps pass around friction-rollers on the rear of the shutter, to diminish the friction and assist in tightening, and the rods which cross the openings make the straps adjustable to varying sizes of animals. On the lower edge of the shutter is an opening, and behind the latter is a bar or bars, to which the chains C are attached by rings which slide on the bars D, which latter are pivoted to an upright pillar, E. The chains connect to hobble-straps F around the pasterns of the animal, and the hobble-straps are coupled to each other by the cord or strap G, by which the hind and fore feet are drawn into a bunch, or such feet as may be required for the operation on hand. This cord is in the hands of an attendant, and may be belayed, if necessary.

There are two or three partially distinct objects to be attained, which I will enumerate.

First. It may be required to attach the animal to the shutter or operating-table A, for operating upon the horse in the standing or recumbent position. In this case he is secured to the shutter A by means of the apron $a$, and the surcingle-straps $a'$ $a'$, which pass from the rear of the shutter around his body, and are buckled to the required tension. The strap $a''$ passes fore and aft, and by its action on the breast and haunches keeps him from lunging forward or backward. The straps $a^3$ and $a^4$ confine the neck and muzzle of the animal, and the straps for holding the feet securely have already been described. It may not be amiss to say that the animal will take it more quietly if blindfolded.

Second. If it be desired to suspend the horse to facilitate the setting of a fractured limb, the reduction of a dislocation of the stifle or other joint, or from any cause which renders the animal unable to support his weight in the ordinary manner, the straps $b$ $b$ are hooked to the apron $a$, and are tightened by the rotation of the roller H, around which they pass. This roller has radial arms I upon it, and a ratchet and pawl arrangement, J, by which it is retained in the required position. The rotation of the roller H suspends the animal between the roller and the shutter H, so that its feet are out of contact with the ground.

Third. When it is desired to use the machine to secure a vicious animal while being shod it is secured to the shutter or suspended at the pleasure of the operator, while the foot to be shod is strapped to a cross-bar, K, which protrudes through the shutter A at either of the orifices on the level of the opening L.

These openings are four in number, and are intended for the passage of the bar for securing the fore or hind foot in each of the positions in which the animal may be placed—that is, with the head to the right or to the left—so as to throw the near or the off feet to the outside at will. As a security for the bar its outer end is made to pass through, and is pinned to the roller H, which is lowered for the occasion by removing the pins M, which support the block N in which the roller H is journaled. The pins M being withdrawn the block assumes the lower position, as shown in red lines, and the cross-bar is passed through a mortise in the roller, one of the arms being removed for that purpose if it be in the way. The foot of the animal is then fastened by the strap $a^5$ in a secure manner, and with such a presentation as may be convenient to the operator.

Fourth. There yet remains to be described the means whereby the animal is laid upon its side for examination or veterinary treatment. For this purpose the animal is secured to the shutter A, and the feet confined by the hobbles and chains, and the straps $b\ b$ are cast off at both ends, so as to make the roller H free of any other connection with the moving parts, except by means of the ropes O O with the upper edge of the shutter A. The ropes, as will be seen, pass over the roller P, and the bolts at the back of the shutter being withdrawn, the shutter is inclined and gradually lowered by the manipulation of the arms of the roller to bring the shutter to a horizontal position and constitute it an operating-table for the veterinary surgeon for the treatment of such ills as horse-flesh is heir to, or to which he is subjected by the quarrels of his superiors.

The operation of the machine having been incidentally described in connection with the description of the several parts, I do not deem it necessary to devote any space especially to that, as it would be a mere repetition, though in closer connection, of what has already been stated. I think it necessary, however, to state that the machine may be used for the purpose of subduing a fractious or fortifying a timid disposition, *a la* Rarey.

The rear part of the framing shown in the drawings is not necessary when the device is constructed within a building, but it would be necessary when in the open air or detached from the wall of the building.

Having thus described my invention, what I claim as new, and desire to secure by Letters Patent, is—

1. The falling shutter operated by any suitable lifting and lowering apparatus and furnished with means for attaching animals thereto, substantially as and for the purpose described.

2. The combination of the surcingle, the fore and aft straps, and the head straps for attaching the animal securely in a vertical position, irrespective of the devices for prostrating the animal.

3. The combination of the straps $b\ b$ with the apron and surcingle straps or their equivalents and the roller H, by means of which combined devices the animal may be suspended for treatment or discipline.

4. The combination of the straps by which the body of the horse is secured, those pertaining to the hobbling of the feet, and the crossbar and strap to which a foot is secured for shoeing, &c., forming in this connection a device for the compulsory acquiescence of the animal in the operation of shoeing or other treatment in which such position of the limb or foot is desirable.

To the above specification of my improved general horse fastener I have signed my name this 28th day of March, 1865.

FIX. VOGELI.

Witnesses:
ALEX. A. C. KLAUCKE,
C. D. SMITH.